Figure 1:
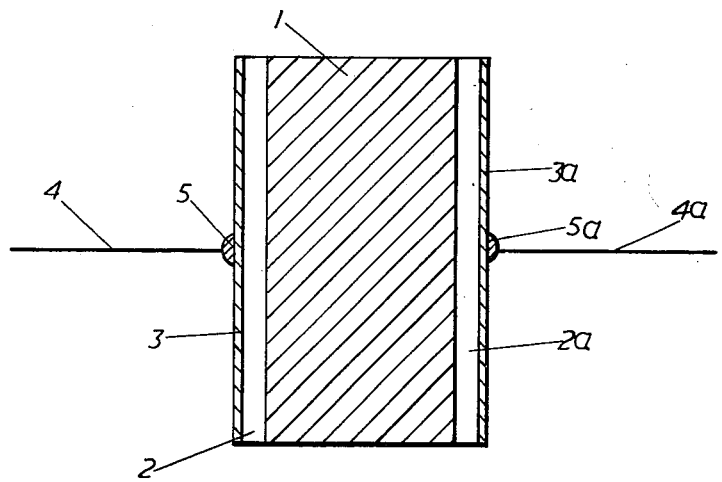

*Inventors*
Ronald A. Hill
Alan W. Stirling
By
*Attorney*

3,160,944
ELECTRICAL CIRCUIT ELEMENTS
Ronald Alfred Hill and Alan William Stirling, London, England, assignors to International Standard Electric Corporation, New York, N.Y.
Filed Apr. 11, 1960, Ser. No. 21,430
Claims priority, application Great Britain, Apr. 24, 1959, 14,152/59
3 Claims. (Cl. 29—25.42)

This invention relates to electric circuit elements which include a body containing high dielectric constant ceramic material, and which may be used to form circuit components, such as variators, rectifiers, and capacitors.

The use of high dielectric constant ceramic materials for the manufacture of capacitors is known, and capacitors made with bodies of these materials have a high capacitance per unit area and volume.

Typical compositions used for these bodies contain the titanates of barium, strontium and calcium, to which other additions are made chiefly for the purpose of producing either improved ageing, or greater stability of properties with temperature.

Attempts have been made to increase the capacitance of these elements by decreasing the thickness of the ceramic material between the electrodes, but the results are unsatisfactory because of the brittle nature of the materials. Another method which has been used takes advantage of the fact that these ceramics can be made conducting by the addition of rare earth oxides.

In making a capacitor employing dielectric ceramic material it is known to make a ceramic body consisting essentially of an alkaline earth metal titanate or titanates to which has been added a small percentage (e.g. 0.5%) of rare earth oxides, specifically lanthanum oxide, by a method which includes heating in an oxidising atmosphere to produce the ceramic body, heating in a reducing atmosphere to make the body semi-conducting and then applying silver electrodes by firing in an oxidising atmosphere. The latter step is stated to produce a thin insulating layer beneath each electrode.

The resulting capacitors have comparatively high capacitance per unit area, but are unfortunately only useful for voltages up to 4 volts, because of the extremely rapid increase in leakage current above this voltage.

By using a rare earth titanate as an additive to a body of high dielectric constant ceramic material in place of lanthanum oxide the present invention makes it possible to produce immediately beneath an electrode a dielectric layer of very high resistivity which has a higher breakdown strength than can be obtained with ceramic bodies in which lanthanum has been incorporated as an oxide.

A particular method of making a capacitor in accordance with the present invention includes the following steps.

(1) Making a mixture of barium titanate, or a mixture of barium and strontium titanates, with a certain proportion of lanthanum or other rare earth titanate. Known ceramic techniques, such as incorporating in the mixture certain proportions of binder and lubricants, are used.

(2) Pressing this material into suitable shapes, such as discs.

(3) Firing in an oxidising atmosphere at a temperature between 1300° C. and 1500° C. for several hours to form ceramic bodies.

(4) Reducing these ceramic bodies in hydrogen or other suitable reducing atmosphere for about one hour at 900° C.

(5) Applying a silver composition to the faces of the discs and firing in an oxidising atmosphere at a comparatively low temperature e.g. 500° C.

(6) Subjecting the silvered discs to re-oxidation at a temperature up to the melting point of silver for a suitable period.

As mentioned above, it is a known practice to produce conducting ceramic bodies by the use of a small proportion of lanthanum or other rare earth oxide. This proportion does not usually exceed 1 mole percent. An essential step in the process of the present invention is to use a mole proportion, for example 5%, of lanthanum or other rare earth oxide in stoichiometric proportion with titanium dioxide. The compound in the case of lanthanum is $LA_2O_3.3TiO_2$ or expressed in another way $La_{2/3}TiO_3$. This compound is known to have the same perovskite structure as barium or strontium titanate but with one third of the lattice points normally occupied by lanthanum atoms vacant. It is sufficient to incorporate the appropriate quantities of lanthanum oxide $La_2O_3$ and titanium oxide $TiO_2$ in the barium or barium/strontium titanate material, but it is preferred to make the compound previously by mixing the constituent oxides intimately and firing at 1250° C. for one hour. The resulting white compound is then added to the main titanate composition together with the binder and lubricant for pressing.

The ceramic body produced at step (3) above has a resistivity of between $10^{10}$ and $10^{12}$ ohm-centimetre, and it can be regarded as a typical insulating ceramic body. After reduction at step (4) the resistivity may be as low as one ohm-centimetre. The unit provided by step (5) with the silver electrodes in place and with an area (each face) of one square centimetre has a capacitance in the region 1 to 5 microfarads. At this stage of manufacture the unit has a high conductivity and is not suitable for use as a capacitor. It is then oxidised by heating it in an oxidising atmosphere for a period of time which may be varied in accordance with the capacitance and working voltage which is required. Oxidation takes place because of the high solubility of oxygen in silver up to the melting point of the metal, which permits easy diffusion of oxygen through it. This step results in the formation of a highly insulating layer under each of the silver electrodes, the thickness of which, knowing the capacitance of the unit and the known dielectric constant of the composite ceramic, is estimated to be about 25 microns (1 mil). As the two dielectric layers so formed are connected with one another through the body of the conducting part of the ceramic, the effective capacitance of the unit is half that of each capacitor so formed.

The following approximate values of capacitance are reached for the following periods of oxidation in air at 900° C.

Figure 2:
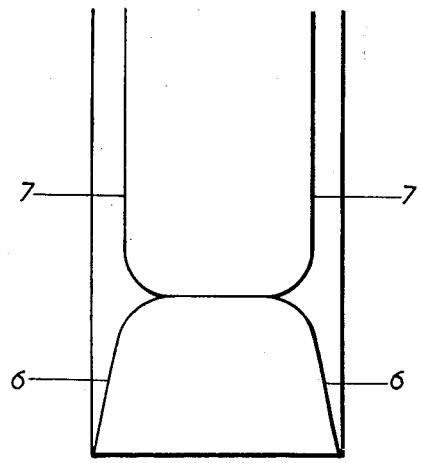

$0.5\mu f$. per square centimetre—½ hour
$0.1$–$0.3\mu f$. per square centimetre—1–2 hours
$0.05$–$0.1\mu f$. per square centimetre—2–3 hours A section through a capacitor unit made in accordance with the present invention and a diagram showing the resistivity of the unit across its section as an ordinate will now be described with reference to FIGS. 1 and 2 of the accompanying drawing respectively.

Referring to the drawings, 1 represents the conducting part of the ceramic body, 2 and 2a the dielectric layers, 3 and 3a the silver electrodes, and 4 and 4a the leads forming the terminals of the capacitor. These leads are of silver wire suitably attached to the electrodes by means of blobs of silver composition 5 and 5a similar to that used to form the electrodes. The unit may be protected from moisture by varnishing, by encapsulation, or by other known means, but tests have shown that it is little affected by normal atmospheric conditions over periods of several months even without this protection.

Curve 6 shows the resistivity of the reduced body to be relatively high in the middle and low at the faces. Curve 7 shows that after oxidation through the silver electrodes the surface layers attain a high resistivity while the interior remains almost unaffected. The result of this is a sharp division between the dielectric layers and the interior. At the same time, the interior remains of sufficiently low resistivity so that power factor, given by $wCR$, where $w$=angular frequency, $R$=series resistance, and $C$=capacitance, remains at a low figure. The power factor of units made by the method described is about 5 to 10%.

Capacitors having characteristics within the following ranges have been made by the process described. The capacitance values are also given in terms of apparent dielectric constant (K) for a unit of one square centimetre per face and a thicknes of one millimetre.

| Capacitance, µf. | Apparent K | Insulation Resistance in Megohms |
| --- | --- | --- |
| 0.05–0.1 | 50,000–100,000 | 250–300 at 50–70 volts. |
| 0.1–0.5 | 100,000–500,000 | 70–300 at 30 volts. |

Tests have also been made on compositions containing varying proportions of lanthanum titanate and also tests on other temperatures of hydrogen reduction. We have found that a portion of lanthanum titanate above a certain minimum, and also reduction above a certain temperature (about 800° C.), is necessary to obtain the most highly insulating layers. Contrary to expectation, lightly reduced bodies are not the most easily re-oxidised. It is also the case that there is a greater degree of reduction in the outer layers of the hydrogen reduced body of step (4) than in the interior. By oxidation therefore in step (6) the layer of ceramic just under the silver electrodes increases most in resistance. This is shown in curve 7 of FIG. 2.

Further tests have established that diffusion of silver which takes place during step (6) also helps the oxidation process. The reason for this is probably the formation of the compound $(AgLa)TiO_3$. Monovalent silver ions $Ag+$ oppose the influence of the trivalent lanthanum ions $La^{3+}$ and help the development of high insulation resistance in the dielectric layers.

Tests have also been made on single sided units in which one of the capacitors has been replaced by an ohmic contact. Electrical tests have shown that the resulting units are rectifiers with a high ratio of forward to reverse resistance. They may be used as rectifiers with a reverse voltage equal to that of the working voltage of the corresponding capacitor. Further, by connecting two such units in parallel but with reversed polarity they may be used as varistors. The ohmic contact may be formed by removing one silver layer together with its dielectric layer by grinding, rubbing indium metal well into the surface and re-applying a silver layer fired on at 550° C. in an oxidising atmosphere.

A suitable composition for the manufacture of capacitors according to the described method is:

Barium titanate _____gms__ 95
Lanthanum titanate _____gms__ 5
Methyle cellulose _____gms__ 1.5
Stearic acid _____gms__ 0.75
Water _____ml__ 80

The materials are ball-milled for 2 hours, after which the slurry is removed to a shallow basin and the water removed by evaporation in an oven at 100–110° C. The mixture remaining is then ready for pressing and firing. The density of the fired discs should be 5.6–5.8 gms./cc.

According to our preferred process, the proportion of lanthanum titanate should be from 4–8 mol percent of the amount of barium (or barium strontium) mixture used. Below this proportion the insulating properties of the oxidised layers are not so good. Above this proportion the power factor of the capacitors deteriorates.

Although in the particular method described the ceramic body is reduced at 900° C., this step may take place at a temperature in the range 800° to 1200° C. in any well known manner. Similarly the firing of the electrodes in the particular method described is at 500° C., but this step may be performed at any suitable temperature up to 900° C. The reoxidised layer under the electrode may be produced when the electrode is fired on or as a separate step.

While the principles of the invention have been described above in connection with specific embodiments, and particular modifications thereof, it is to be clearly understood that this description is made only by way of example and not as a limitation on the scope of the invention.

What we claim is:

1. A method of manufacture of a circuit element which comprises mixing barium titanate with lanthanum titanate and a binder shaping the mixture thus formed into a body having a predetermined shape, firing the body in an oxidising atmosphere to produce an insulating ceramic body, firing the insulating ceramic body in a reducing atmosphere to produce a conducting ceramic body, firing a metal electrode on to the conducting ceramic body in an oxidising atmosphere and producing an oxidised layer beneath the electrode.

2. A method of manufacture of an electrical circuit element comprising mixing ceramic dielectric materials with a rare earth titanate in the proportion of between 4 and 8 mol percent of the said materials, pressing the mixture thus formed into a body of predetermined shape, firing the body in an oxidising atmosphere at a temperature between 1300° C. and 1500° C. to produce an insulating ceramic body, firing the resultant body in a reducing atmosphere at a temperature between 800° C. and 1200° C. to produce a conducting ceramic body, firing a silver electrode on to the conducting ceramic body in an oxidising atmosphere at a temperature not in excess of 900° C. and producing an oxidised layer beneath the electrode.

3. A method of manufacture, as claimed in claim 2, in which the said ceramic dielectric materials include barium and strontium titanates.

References Cited in the file of this patent
UNITED STATES PATENTS

| | | |
| --- | --- | --- |
| 2,520,376 | Roup | Aug. 29, 1950 |
| 2,633,543 | Howatt | Mar. 31, 1953 |
| 2,712,172 | Bayha | July 5, 1955 |
| 2,721,966 | Jenkins et al. | Oct. 25, 1955 |
| 2,990,606 | Napolin | July 4, 1961 |